United States Patent Office 3,644,454
Patented Feb. 22, 1972

3,644,454
CHROMIUM COMPLEXES OF FLUOROCARBON ACIDS
Louis G. Anello, Basking Ridge, and Richard F. Sweeney, Randolph Township, Dover, N.J., assignors to Allied Chemical Corporation, New York, N.Y.
No Drawing. Filed Nov. 1, 1968, Ser. No. 772,832
Int. Cl. C07f 11/00
U.S. Cl. 260—438.5 C    9 Claims

ABSTRACT OF THE DISCLOSURE

Chromium complexes of propionic and butyric acids substituted in the 3- or 4-position, respectively, with a fluorinated alkoxy group, said alkoxy group terminated with a highly fluorinated branched chain or cyclic fluoroalkoxy group. These chromium complexes are useful as treating agents to impart oil and water resistance to various substrates, including paper, leather, and the like.

---

This invention relates to novel chromium complexes of fluorocarbon carboxylic acids which are useful for treating a variety of substrates to impart oil and water resistance thereto. More particularly, this invention relates to chromium complexes of propionic and butyric acids substituted in the 3- or 4-position, respectively, with a fluorinated alkoxy group, said alkoxy group terminated with a highly fluorinated branched chain or cyclic fluoroalkoxy group.

The fluorocarbon carboxylic acids used in making the chromium complexes of the present invention have the formula:

(1)
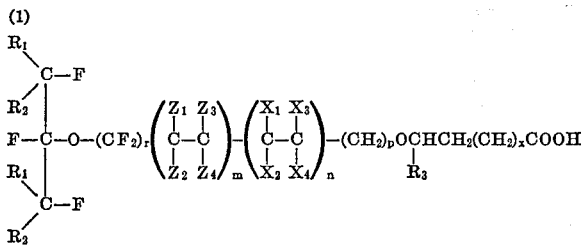

wherein $R_1$ and $R_2$ independently can be fluorine, chlorine or perfluoroalkyl and together can form a perfluoroalkylene group, with the proviso that both $R_1$ and $R_2$ cannot be chlorine; $R_3$ can be hydrogen or lower alkyl of 1 to 6 carbon atoms; $Z_1$, $Z_2$, $Z_3$ and $Z_4$ are independently selected from the group consisting of hydrogen, fluorine and chlorine providing no more than two of $Z_1$–$Z_4$ are chlorine; $X_1$, $X_2$, $X_3$ and $X_4$ are hydrogen, chlorine or fluorine, providing no more than one of $X_1$–$X_4$ is chlorine; $r$ is an integer of 1 to 2; $m$ and $n$ are integers of from 0 to 75; the sum of $m$ and $n$ is 0–75; $p$ is an integer of 0 or 1 providing that when $p$ is 0, $n$ must be at least one and $X_3$ and $X_4$ must be hydrogen; and $x$ is an integer of 0–1. Preferably $m$ and $n$ are integers from 0–10.

The fluorocarbon acids of the invention are prepared from their corresponding polyfluoroisoalkoxyalkyl iodides of the formula (2)
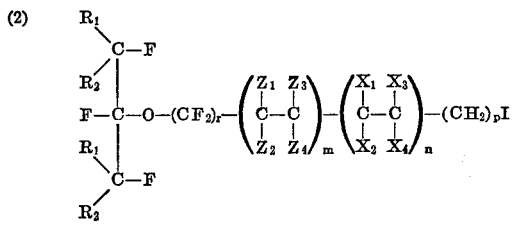

wherein $R_1$, $R_2$, $Z_1$–$Z_4$, $X_1$–$X_4$, $m$ and $n$, $r$ and $p$ have the meanings given above. These iodides can be reacted with $SO_3$ to form the corresponding pyrosulfates or with oleum to form the corresponding hydrosulfates. Upon hydrolysis of the pyrosulfates or hydrosulfates with an aqueous mineral acid, the corresponding alcohols are obtained. These alcohols can be reacted with an unsaturated nitrile in the presence of an alkali metal catalyst and the nitrile products hydrolyzed to form the present acids.

The iodides of Formula 2 and their preparation are more fully described in copending U.S. application Ser. No. 633,359 filed Apr. 25, 1967. These iodides are prepared by reacting polyfluoroisoalkoxyalkyl iodides of the formula (3)
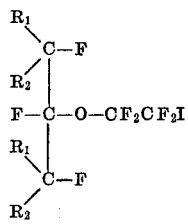

wherein $R_1$ and $R_2$ have the meanings given above with telomerizable unsaturated compounds having the formula $Z_1Z_2C=CZ_3Z_4$ and/or $X_1X_2C=CX_3X_4$ wherein $Z_1$–$Z_4$ and $X_1$–$X_4$ have the meanings given above. Suitable telomerizable compounds include ethylene, tetrafluoroethylene, chlorodifluoroethylene, difluoroethylene, and the like. The telomerization reactions can be initiated by heat e.g. temperatures from about 100° C. to about 350° C., preferably from about 150 to 200° C., or by a free radical initiator, e.g. azobisisobutyronitrile, benzoyl peroxide and the like.

The polyfluoroisoalkoxyalkyl iodides can be prepared by reacting a suitable halogenated ketone with an ionizable fluoride salt, e.g. cesium fluoride or potassium fluoride, to form a fluorinated organic salt and reacting the organic salt with tetrafluoroethylene and iodine. Preparation of the polyfluoroisoalkoxyalkyl iodides is described in copending U.S. applications Ser. No. 492,276 filed Oct. 1, 1965, and Ser. No. 513,574 filed Dec. 13, 1965, The pertinent subject matter of these applications is hereby incorporated by reference.

Alcohols corresponding to the formula (4)
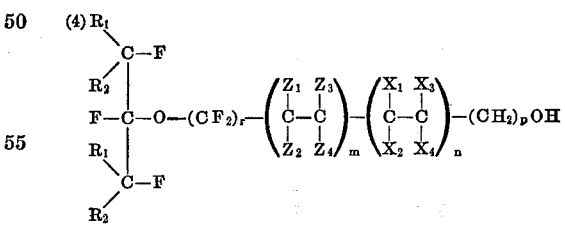

wherein $R_1$, $R_2$, $Z_1$–$Z_4$, $X_1$–$X_4$, $r$, $m$, $n$ and $p$ are as hereinabove described, are disclosed in copending U.S. application Ser. No. 721,089 filed Apr. 12, 1968. These alcohols can be prepared by reacting an iodide of Formula 2 with sulfur trioxide or oleum and hydrolyzing the products with an aqueous acid to the free alcohol.

The alcohols can be reacted with an unsaturated nitrile in the presence of an alkali metal catalyst. This type of reaction is known and takes place readily at temperatures from about room temperature to about 75° C. at atmospheric pressure.

At least one mol of unsaturated nitrile per mol of acid is required for complete reaction and in general a small excess of the nitrile is employed, on the order of 1.1 to 1.5 mols of nitrile per mol of alcohol. Larger amounts can be employed, but no advantage is gained thereby.

Suitable unsaturated nitriles have the formula $$R_3HC{=}CH(CH_2)_xCN$$

wherein $R_3$ and $x$ have the meanings given above and include, for example, acrylonitrile, methacrylonitrile, propylacrylonitrile, allyl cyanide and the like.

Any alkali metal catalyst can be employed including lithium, potassium, sodium, and the like. The catalyst concentration can vary from about 0.5 to 50 mol percent of the alcohol, but preferably 0.5 to 20 mol percent is adequate.

The excess alkali metal is reacted with concentrated sulfuric acid and the nitrile product recovered, as by distillation or other means as will be known to one skilled in the art.

The nitrile as prepared above is hydrolyzed with an acid in conventional manner with a strong mineral acid. Suitable acids include, for example, 30–80%, preferably 65–75% sulfuric acid, concentrated hydrochloric acid or phosphoric acid. From 1–10, preferably 1–5 mols of acid per mol of nitrile will ensure complete conversion. Hydrolysis is carried out at any convenient temperature, but in general, increasing the temperature increases the rate of reaction. Preferably, the hydrolysis is carried out at reflux temperature, or from about 100–155° C.

The desired acids can be recovered and further purified in conventional manner, usually by distillation.

The criticality in the structure of the above-described acids is in the polyfluoroalkoxyalkyl tail portion of the molecule wherein an ether oxygen atom links a fluorinated carbon atom attached to two fluoroalkyl groups and at least one —$CF_2$—group.

According to the preferred embodiments of the present invention, acids having the following formula are particularly preferred for preparing chromium complexes useful as paper sizes.

(5)

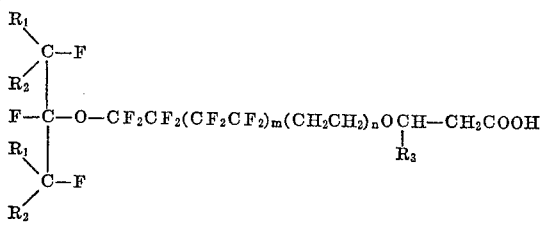

wherein $R_1$ and $R_2$ are fluorine or perfluoroalkyl of 1 or 2 carbon atoms, $m$ is an integer from 0–10 and $n$ is an integer from 1–10 and $R_3$ is hydrogen or alkyl of 1–5 carbon atoms.

Other methods of preparing the acids of the invention will be known to one skilled in the art.

The chromium complexes of the fluorocarbon carboxylic acids described above are Werner-type coordination complexes. They are prepared in known manner by reacting a suitable acid as hereinabove described with chromyl chloride in an anhydrous solvent in the presence of a reducing agent.

The molar ratio of the acid to chromyl chloride is not critical and can vary over a wide range but generally from about 2 to about 20 mols of chromyl chloride per mol of acid is employed.

The reducing agents preferred are alcohols, which can also be employed as the solvent for the reaction. Suitable alcohols include straight or branched chain aliphatic alcohols such as methanol, ethanol, propanol, isopropanol, butanol, isopentanol and the like. Excellent results are obtained with isopropanol. In addition to an alcohol solvent, other inert, anhydrous solvents can also be employed, including haloalkanes such as carbon tetrachloride, chloroform, sym-dichloroethane and the like. The presence of an inert solvent is advantageous in avoiding excessive reaction temperatures since the reaction between the acid and chromyl chloride is exothermic. In a preferred mode of operation, the chromyl chloride is dissolved in an inert solvent such as carbon tetrachloride and the solution is added slowly to the acid solution, maintaining the temperature at or near the reflux temperature of the reaction mixture.

The resultant green solution contains the chromium complexes of the acid. The chromium complexes can be isolated as green solids but preferably are used directly in the solvent in which they were prepared. The alcoholic solution can be employed as is, diluted further with an alcohol or acetone, or part of the solvent can be evaporated by known means to obtain a more concentrated stock solution. A small amount of water is added advantageously to the stock solution to stabilize the solution and prevent precipitation of complex solids upon standing.

The chromium complexes of the invention are useful to impart oil and water resistance to various substrates including paper, cellulosic films, wood, leather, textile fibers, yarns and fabrics, ceramic products, metals such as aluminum, rubber, and the like.

Dilute aqueous solutions, containing from about .01 to about 10% by weight of chromium complex solids, are particularly effective as sizes for paper. Papers coated with a small amount of the chromium complexes of the invention show excellent water and ink resistance, and superior oil repellency. The treated paper are outstanding for use as protective packaging materials and the like.

The invention will be further illustrated by the following examples, but it is to be understood that the invention is not meant to be limited to the details therein. In the examples, all parts and percentages are by weight unless otherwise noted.

In the examples, the relative penetration of ink to paper is determined by the ink flotation test according to the following procedure: a 1.5 inch square of treated paper is folded to turn up all the edges. The square is floated on standard writing ink. The time in seconds required for the ink to penetrate evenly to the upper surface of the paper is noted as the ink penetration. A time of 900 seconds or longer denotes excellent ink resistance.

The water repellency of treated paper is determined according to standard test T441-os-63 of the Technical Association of the Pulp and Paper Industry (Cobb Test). This test determines the amount of water absorbed by the paper after two minutes. A value of about 25 indicates excellent water resistance.

The oil resistance of treated papers is determined by the Kit test as follows: A kit of 12 solutions of varying proportions of castor oil, toluene and heptane is prepared, as set forth in the following table. A value of 8 or higher is good.

| | Parts by volume | | |
|---|---|---|---|
| | Castor oil | Toluene | Heptane |
| Kit No.: | | | |
| 1 | 200 | 0 | 0 |
| 2 | 180 | 10 | 10 |
| 3 | 160 | 20 | 20 |
| 4 | 140 | 30 | 30 |
| 5 | 120 | 40 | 40 |
| 6 | 100 | 50 | 50 |
| 7 | 80 | 60 | 60 |
| 8 | 60 | 70 | 70 |
| 9 | 40 | 80 | 80 |
| 10 | 20 | 90 | 90 |
| 11 | 0 | 100 | 100 |
| 12 | 0 | 90 | 110 |

The Kit value is the highest numbered solution that will stand on the surface to be tested in the form of a drop for 15 seconds, with no penetration of the solution, noted by any darkening of the area under the drop.

EXAMPLE 1

4 - heptafluoroisopropoxy - 3,3,4,4 - tetrafluorobutyl iodide (38 parts) having a boiling point of 85–87° C./100 mm. were charged to a vessel fitted with a stirrer, dropping funnel, thermometer and a condenser connected to a trap at −78° C. 28 parts of stabilized $SO_3$ were added, maintaining the temperature at 35–45° C. Iodine was precipitated during the reaction. The mixture was heated to 70° C. for two hours to complete formation of the pyrosulfate product. The mixture was cooled to room temperature, and 100 parts by volume of 35% sulfuric acid were added slowly to hydrolyze the pyrosulfate to the alcohol. A small amount of $Na_2SO_3$ was added to remove any elemental iodine and the mixture heated for one hour at 105° C. Upon standing, two layers formed. The aqueous layer was washed with ether and the extract combined with the organic layer. The organic product was distilled over a spinning band column.

A 70% yield of 4-heptafluoroisopropoxy-3,3,4,4-tetrafluorobutanol was recovered having a boiling point of 84° C./59 mm.

*Elemental analysis.*—Calculated for $C_7H_{11}H_5O_2$ (percent): C, 25.5; F, 63.3; H, 1.6. Found (percent): C, 24.9; F, 62.6; H, 1.6.

One hundred parts of the alcohol product, 1 part of sodium metal and 16.1 parts of acrylonitrile were charged to a vessel. The temperature dropped at first to 20° C., then rose to 54° C. The mixture was stirred overnight at 25° C. and made acid with 4.4 parts of concentrated sulfuric acid. The mixture was filtered and distilled.

3 - [4 - (heptafluoroisopropoxy) - 3,3,4,4-tetrafluorobutoxy]propionitrile (77.9 parts) having the structure $$(CF_3)_2CFOCF_2CF_2CH_2CH_2OCH_2CH_2CN$$

were recovered as a liquid with a boiling point of 104–105° C./5 mm. The structure was confirmed by infrared analysis which showed a nitrile absorption band at 4.4 microns.

*Elemental analysis.*—Calculated for $C_{10}F_{11}H_8NO_2$ (percent): C, 31.3; F, 54.5; H, 2.1; N, 3.7. Found (percent): C, 31.3; F, 54.3; H, 2.2; N, 3.8.

The nitrile prepared above (43.9 parts) and 53 parts of 70% sulfuric acid were combined and heated at 100° C. for three hours, then stirred at 60° C. overnight. Water was added in sufficient quantity to dissolve the ammonium sulfate by-product. The water-insoluble oil was separated, dried and distilled.

An 81% yield (38 parts) of 3 - [4 - (heptafluoroisopropoxy)-3,3,4,4-tetrafluorobutoxy]propionic acid of the formula $$(CF_3)_2CFOCF_2CF_2CH_2CH_2OCH_2CH_2COOH$$

were recovered having a boiling point of 121–123° C./4 mm.

The structure was confirmed by infrared analysis which showed a carboxyl absorption at 3.2–3.4 microns and a carbonyl absorption at 5.8 microns.

*Elemental analysis.*—Calculated for $C_{10}F_{11}H_9O_5$ (percent): C, 29.9; F, 52.0; H, 2.2. Found (percent): C, 29.6; F, 51.5; H, 2.4.

Seven parts of the acid as prepared above were dissolved in 50 parts by volume of isopropanol. Seven parts of a chromyl chloride solution in 10 parts by volume of carbon tetrachloride were added dropwise while stirring. The temperature rose to 70° C. during the addition. Forty parts by volume of the solvent were distilled off. About 0.5 part of water and 34 parts of isopropanol were added. The resultant green solution contained about 25% of the chromium complex of 3 - [4 - (heptafluoroisopropoxy)-3,3,4,4-tetrafluorobutoxy]propionic acid.

A portion of the solution was evaporated to remove the solvent. A green solid chromium complex was obtained. A portion of the solution was diluted with water to a 1% solution of the chromium complex. An unsized paper handsheet was dipped into the solution, and excess solution blotted off. The treated paper was dried at 115–125° C. for two minutes. Drops of oil and drops of water deposited on the treated sheet either remained on the sheet or ran off, without wetting the paper.

EXAMPLE 2

Unsized, weighed paper sheets were dipped into solutions prepared from the chromium complex of Example 1 diluted to various concentrations with solvent or with water. The aqueous solutions were adjusted to varying pH. The sheets were blotted dry, and reweighed to determine the amount of pickup. The sheets were tested for oil and water repellency. The results are summarized below:

| Percent chromium complex applied | Solvent | Kit No. | Cobb size | Ink flotation |
|---|---|---|---|---|
| 1.0 | Isopropanol | 8 | 36.4 | 900+ |
| 0.5 | do | 8 | 29.6 | 900+ |
| 0.25 | do | 4 | 48.8 | 2–3 |
| 0.5 | Water, pH 3.4–4.0 | 10–11 | 23.2 | 900+ |
| 0.5 | Water, pH 7.0 | 8 | 28.4 | 900+ |
| 0.5 | Water, pH 12.0 | 7 | 52 | |

Other chromium complexes are prepared following the procedure given in Example 1 for other acids encompassed by the general formula from the corresponding alcohols and nitriles. These chromium complexes are found to impart both oil and water resistance to paper, as well as to other substrates as hereinbefore described.

EXAMPLE 3

The procedure of Example 1 is followed to prepare a chromium complex of an acid of the formula

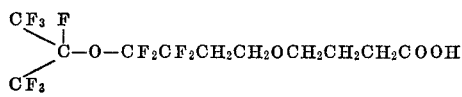

EXAMPLE 4

The procedure of Example 1 is followed to prepare a chromium complex of an acid of the formula

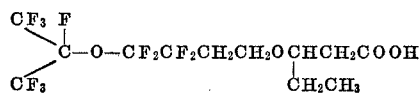

EXAMPLE 5

The procedure of Example is followed to prepare a chromium complex of an acid of the formula

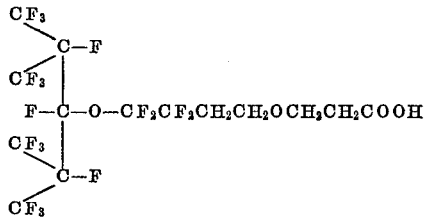

EXAMPLE 6

The procedure of Example 1 is followed to prepare a chromium complex of an acid of the formula

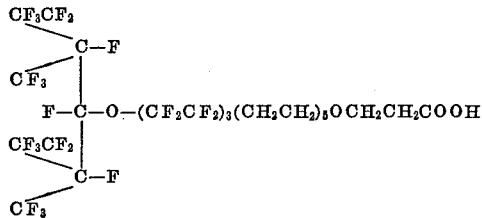

EXAMPLE 7

The procedure of Example 1 is followed to prepare a chromium complex of an acid of the formula

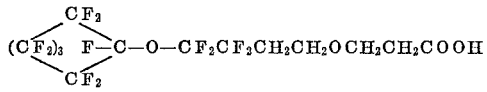

EXAMPLE 8

The procedure of Example 1 is followed to prepare a chromium complex of an acid of the formula

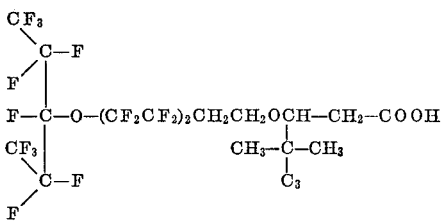

EXAMPLE 9

The procedure of Example 1 is followed to prepare a chromium complex of an acid of the formula

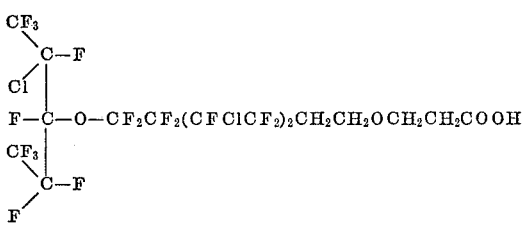

EXAMPLE 10

The procedure of Example 1 is followed to prepare a chromium complex of an acid of the formula

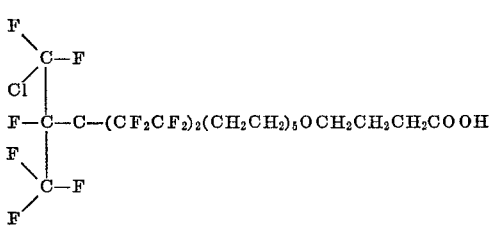

EXAMPLE 11

The procedure of Example 1 is followed to prepare a chromium complex of an acid of the formula

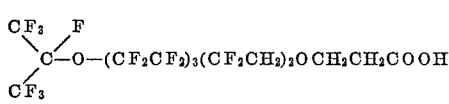

EXAMPLE 12

The procedure of Example 1 is followed to prepare a chromium complex of an acid of the formula

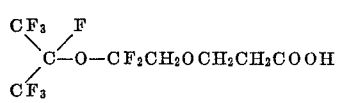

It will be apparent that numerous variations and modifications can be effected without departing from the novel concepts of the invention and the illustrative details disclosed are not to be construed as imposing undue limitations on the invention.

We claim:

1. Chromium complexes of the Werner type of a fluorocarbon carboxylic acid of the formula

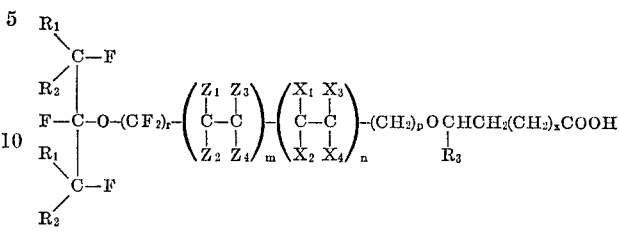

wherein $R_1$ and $R_2$ independently at each occurrence can be fluorine, chlorine and perfluoroalkyl and together can form a cyclic perfluoroalkylene group, with the proviso that both $R_1$ and $R_2$ cannot be chlorine; $R_3$ is hydrogen or lower alkyl; $Z_1$, $Z_2$, $Z_3$ and $Z_4$ are independently selected from the group consisting of hydrogen, fluorine, and chlorine with the proviso that no more than two of $Z_1$–$Z_4$ are chlorine; $X_1$, $X_2$, $X_3$ and $X_4$ are independently hydrogen, chlorine or fluorine with the proviso that no more than one of $X_1$–$X_4$ is chlorine; $r$ is an integer of 1–2; $m$ and $n$ are integers from 0–75; the sum of $m$ and $n$ is 0–75; and $p$ is an integer of 0 or 1 with the proviso that when $p$ is 0, $n$ must be at least one and $X_3$ and $X_4$ must be hydrogen; and $x$ is an integer of 0–1.

2. Chromium complexes according to claim 1 wherein $m$ and $n$ are integers of 0–10.

3. Chromium complexes according to claim 1 wherein said acid has the formula

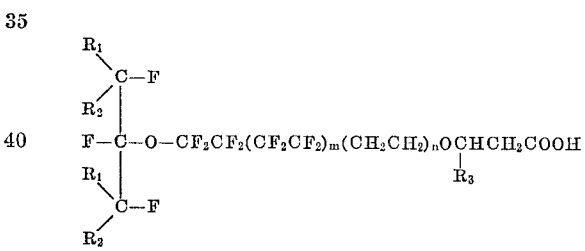

wherein $R_1$ and $R_2$ are fluorine or perfluoroalkyl of 1 to 2 carbon atoms; $m$ is an integer from 0–10 and $n$ is an integer from 1–10; and $R_3$ is hydrogen or alkyl of 1 to 5 carbon atoms.

4. The Werner-type chromium complex of an acid of the formula

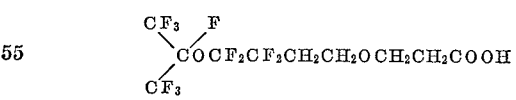

5. Chromium complexes according to claim 3 wherein $R_3$ is hydrogen.

6. A chromium complex in accordance with claim 2 of an acid of the formula

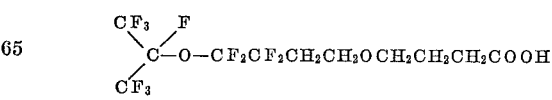

7. A chromium complex in accordance with claim 5 of an acid of the formula

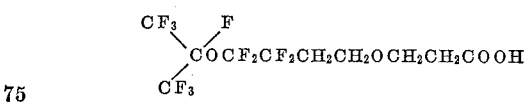

8. A chromium complex in accordance with claim 5 of an acid of the formula
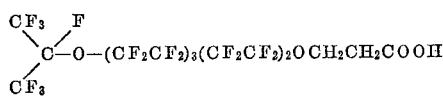
9. A chromium complex in accordance with claim 2 of an acid of the formula
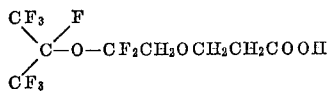
References Cited
UNITED STATES PATENTS
| | | | |
|---|---|---|---|
| 2,662,835 | 12/1953 | Reid | 260—438 C UX |
| 2,693,458 | 11/1954 | Olson | 260—438 C UX |
| 2,904,571 | 9/1959 | La Fleur | 260—438.5 |
| 2,909,545 | 10/1959 | Barnhart | 260—438.5 |
| 3,088,958 | 5/1963 | Eleuterio | 260—438.5 |
| 3,409,647 | 11/1968 | Pittman et al. | 260—408 |
TOBIAS E. LEVOW, Primary Examiner
H. M. S. SNEED, Assistant Examiner
U.S. Cl. X.R.
117—121, 130 R, 139, 142, 143, 151; 252—8.6; 260—408

PO-1050
(5/69)

UNITED STATES PATENT OFFICE
CERTIFICATE OF CORRECTION

Patent No. 3,644,454      Dated February 22, 1972

Inventor(s) Richard F. Sweeney and Louis G. Anello

It is certified that error appears in the above-identified patent and that said Letters Patent are hereby corrected as shown below:

Col. 6, line 48, "Example is " should read -- Example 1 is --;

Col. 7, 4th. formula, that part which reads "F-C-C-" should read -- F-C-O- --;

Col. 9, 1st. formula, that part which reads

"$(CF_2CF_2)_3(CF_2CF_2)_2$"

should read -- $(CF_2CF_2)_3(CF_2CH_2)_2$ --

Signed and sealed this 6th day of March 1973.

(SEAL)
Attest:

EDWARD M. FLETCHER, JR.
Attesting Officer

ROBERT GOTTSCHALK
Commissioner of Patents